United States Patent Office 3,258,044
Patented June 28, 1966

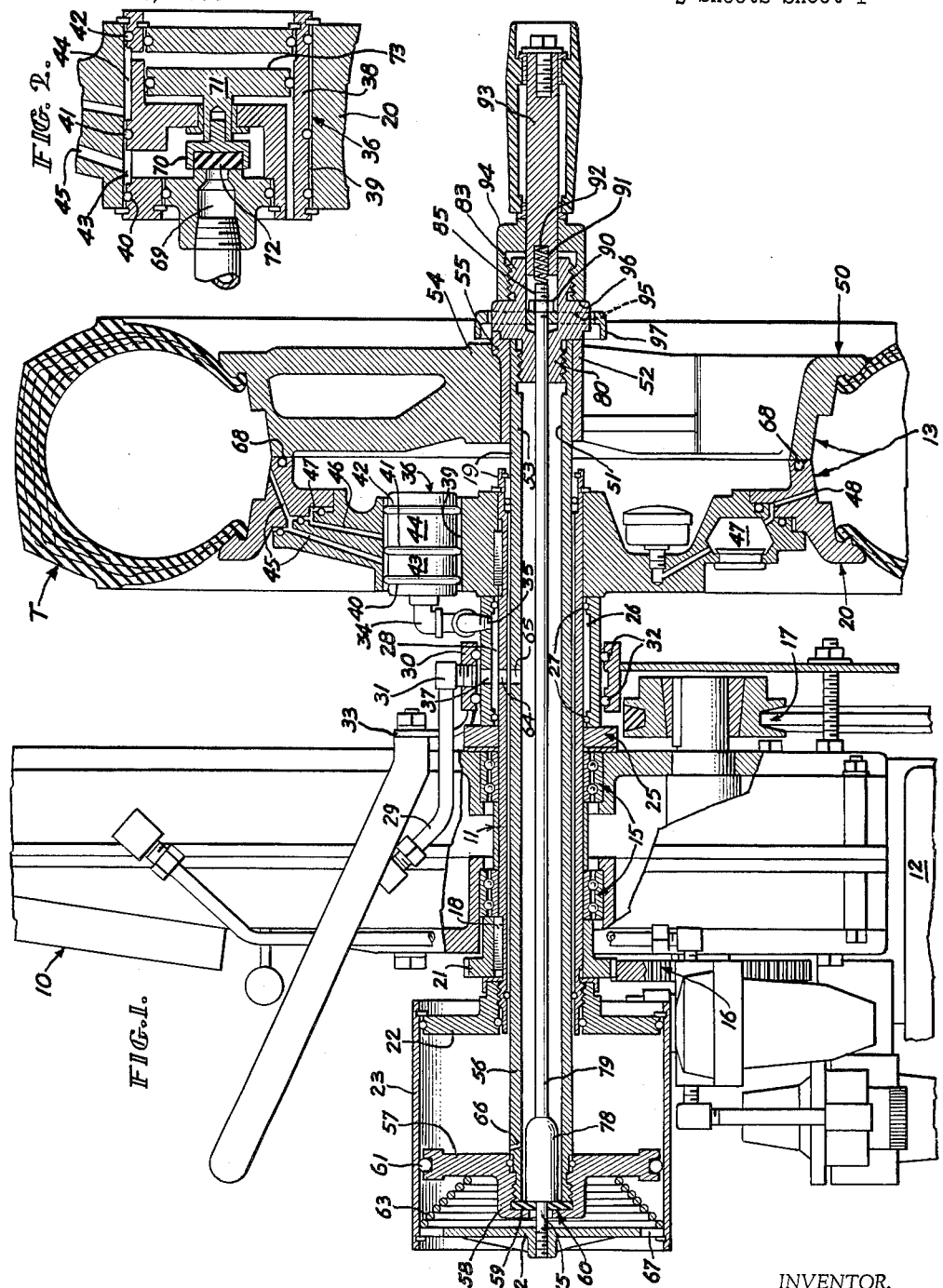

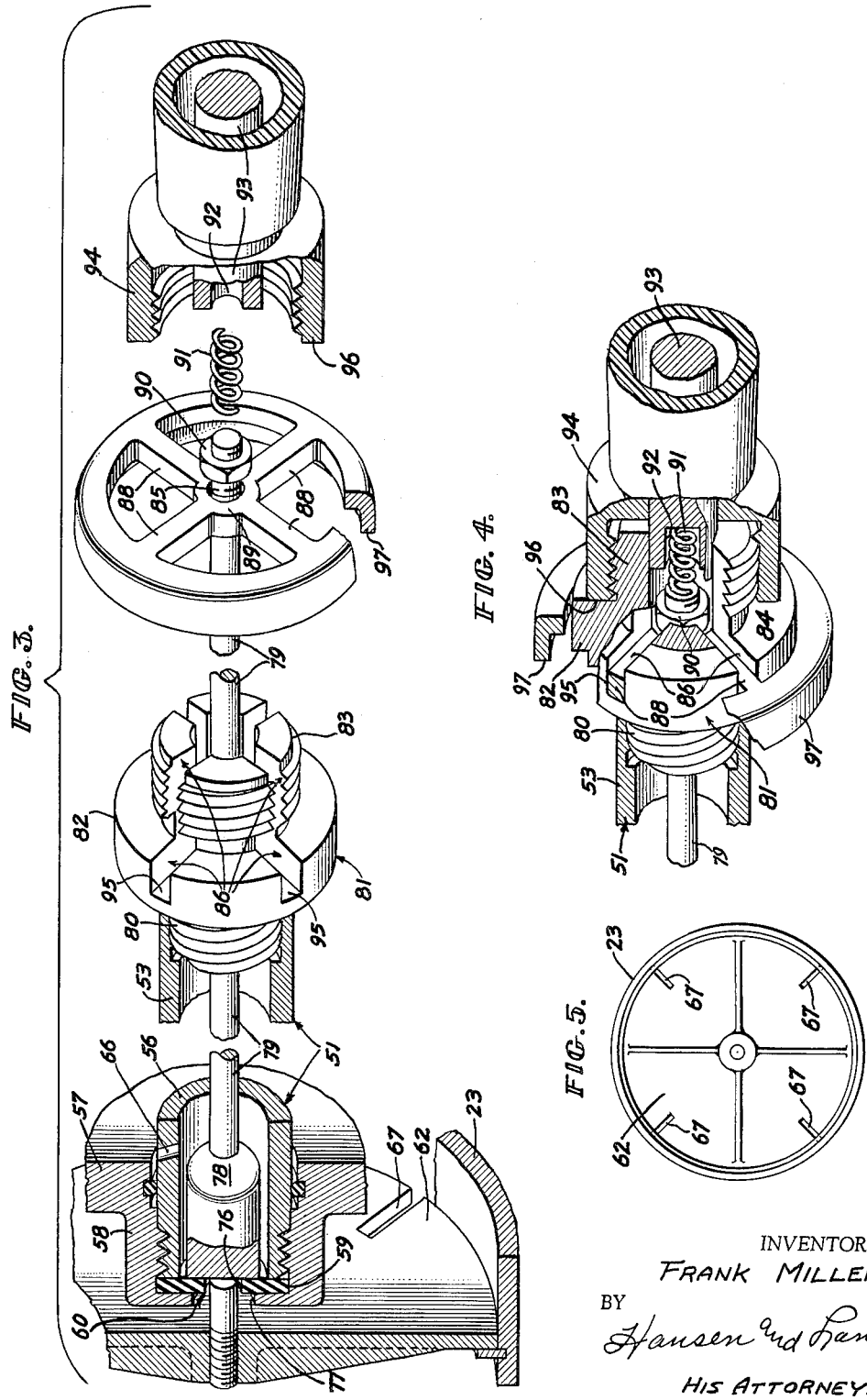

3,258,044
SAFETY RELEASE FOR PNEUMATIC SPLIT
RIM TIRE MOUNT
Frank Miller, Castro Valley, Calif., assignor to Elrick
Industries, Inc., Oakland, Calif.
Filed June 5, 1964, Ser. No. 372,867
7 Claims. (Cl. 144—288)

This invention relates to split rim tire mounts for tire buffing or recapping machines and more particularly to a safety release for the air pressure system by which a tire on such mount is inflated.

The present invention is directed to a safety release for split rim tire mounts of the type described and claimed in U.S. Letters Patent No. 3,127,916 which issued April 7, 1964, to Robertson on an application filed January 1, 1961, under Serial No. 84,443. Briefly such tire mount entails coordinated means for pneumatically securing split rims in tire supporting relation while inflating the tire supported thereon.

It is an object of this invention to provide a touch sensitive release mechanism for relieving the pressure in the system quickly and automatically when required.

It is another object of this invention to provide in a system for pneumatically securing split rims in tire mounting condition, a pressure relief for immediately releasing the forces by which the split rims are urged together in case of an accident or an emergency.

These and other objects and advantages of the present invention will become apparent in the following description and claims when read in the light of the accompanying two sheets of drawing in which:

FIG. 1 is a longitudinal section through the spindle of a split rim tire support and tire and illustrating the safety release of the present invention.

FIG. 2 is an enlarged detail section through a pressure regulator shown in elevation in FIG. 1.

FIG. 3 is an exploded perspective of the elements of the safety release of the present invention.

FIG. 4 is a perspective view of several of the elements of FIG. 3 in assembled relation and partially broken away and shown in section for purposes of illustration.

FIG. 5 is an end elevation of a portion of FIG. 1 as seen from the left end thereof.

Referring to the drawing the tire mount 10 shown in FIG. 1 generally comprises a spindle 11 supported for turning on a standard 12 and having a split rim 13 thereon for supporting a tire to be buffed or otherwise treated.

The spindle 11 is journaled in bearings 15 provided in the standard 12 and is drivingly connected to an electric motor (not shown) but mounted on the standard by suitable power transfer means such as a train of gears 16 and belt and pulleys 17.

The spindle 11 is a tubular shaft having the bearings 15 circumscribing one end 18 thereof so that its other end 19 extends cantilever fashion from the standard 12. One half 20 of the split rim 13 is secured to the extended end 19 of the spindle shaft 11 and keyed thereto for rotation therewith. A gear 21 keyed to the end 18 of the tubular shaft 11 is a part of the train of gears 16 for driving the spindle. Except for rotatability the tubular shaft 11 is stationary to the bearing mounts in the standard 12.

That end 18 of the tubular shaft 11 which extends beyond the gear 21 has a disc-like flange 22 secured thereto. A cylindrical housing 23 has one end thereof mounted on the flange 22 and secured thereto to provide an air tight seal. The cylindrical housing 23 extends outwardly beyond the end 18 of the tubular shaft 11 for turning movement therewith. Except for rotatability the assembly consisting of the tubular shaft 11, cylindrical housing 23 and the one half 20 of the split rim is stationary relative to the bearing mounts 15 and standard 12. Accordingly the half rim 20 for purposes of this description will be referred to as the fixed rim half of the split rim 13.

Between the standard 12 and the fixed rim half 20 is a thrust bearing 25 which bears against the standard 12 and a slip ring sleeve 26 which extends between the bearing 25 and the fixed rim half 20. The slip ring sleeve 26 has end flanges 27—27 which extend internally to bear against the outer surfaces of the tubular shaft 11, each flange having a sealing ring between it and the shaft 11 to provide a cylindrical air transfer chamber 28 around the shaft 11.

Air under about 150 pound per square inch pressure is supplied from a suitable source thereof via a tube 29 coming from the standard 12 to an annular slip ring 30 circumscribing the sleeve 26. The slip ring 30 has an air admittance nipple 31 secured thereto between a pair of sealing rings 32 which bear against the sleeve 26. The slip ring 30 is secured in place by a bracket 33 mounted on the standard 12 so that the ring 30 remains stationary during turning of the sleeve 26. The sleeve 26 is connected to the fixed rim half 20 for turning therewith when the tubular shaft 11 is driven by the gear train. This connection is effected by pipe fittings 34 in which one end is threaded into a tapped bore 35 in the sleeve 30 and communicating with the air transfer chamber 28. The opposite end of the pipe fittings is threaded into a ratio meter 36 mounted in the fixed rim half 20. The sleeve ring 26 has a port 37 formed therein between the sealing rings 32 so that as the sleeve ring turns with the half rim 20 air is admitted into the air transfer chamber 28.

The ratio meter 36 is employed in the pneumatic system in the same manner as the delayed action regulator disclosed, described and claimed in the aforementioned U.S. Patent No. 3,127,916. The only difference in manner of use of this device in the present application is the shape of the unit 36 and manner of affecting communication of the air to the tire and the tire mount.

The ratio meter unit 36 has a solid cylindrical shell 38 press fit into a cylindrical bore 39 formed in the fixed rim half 20 and provided with annular O-rings 40, 41 and 42 suitably seated in annular spaced grooves formed in the shell 38 for providing separated air sealed chambers 43 and 44 between the periphery of the shell and the cylindrical bore 39.

One of the chambers 43 has communication directly with the interior of a tire on the split rim 13 via an air inlet port 45, formed in the fixed rim half 20. The other chamber 44 has communication via a port 46 with an annular air passage 47 provided on the fixed rim half and ultimately communicating with the interior of a tire on the split rims 13 via a port 48 which is diametrically opposite the air inlet port 45.

The split rims 13 include a half rim 50 mounted for movement axially of and toward and from the fixed rim half 20. This rim half 50 is the demountable drop on type for mounting relative to an extension of the spindle 11 in a manner as described and claimed in U.S. Letters Patent No. 2,872,978 which issued February 10, 1959, to John W. Bakke. The demountable rim half is also disclosed in the aforementioned U.S. Patent No. 3,127,916.

The extension of the spindle 11 is on one end of a tubular shaft 51 mounted concentrically of and within the tubular shaft 11 which carries the fixed rim half 20. A suitable collar 52 mounted on the extreme end 53 of the tubular extension 51 serves to receive and hold the open sided hub 54 of the rim half 50 concentric of the spindle. The collar 52 has an outside flange 55 that bears against the outer face of the hub 54 so that the rim half 50 can move toward and from the fixed rim half 20 as the inner tubular shaft 51 moves axially of the spindle shaft 11. Thus it will be appreciated that the demountable rim half is considered and hereinafter referred to as the movable rim half 50.

The opposite end 56 of the inner tubular shaft 51 extends beyond the flanged end 22 of the spindle shaft 11 and into the cylindrical housing 23 secured to the flange 22. Suitable sealing rings are arranged between the inner shaft 51 and the outer shaft 11 to provide an air seal between them. A piston 57 is secured to that end of the shaft 51 within the cylindrical housing 23. This piston 57 has a central boss 58 provided with internal threading which mates with threading on the shaft 51. A rubber seat in the form of a washer 59 is seated in the threaded boss 58 of the piston to bear against the open end of the tubular shaft 51 to provide one side of an air escape valve 60 later to be explained.

The outer peripheral edge of the piston 57 is provided with an annular recess within which a piston ring 61 in the form of an O ring is seated. Thus the piston 57 is pneumatically sealed relative to the cylindrical housing 23. The open end of the cylindrical housing 23 has a closure cover 62 mounted therein to form a fixed base for a compression spring 63 the opposite end of which bears against the piston 57 to force the latter from left to right as seen in FIG. 1. In this manner the inner tubular shaft 51 is shifted axially of the spindle shaft 11 to allow the moveable rim half 50 to move away from the fixed rim half 20. This releases the moveable rim half 50 from a tire mounted on the split rims 13 so that the rim half 50 can be quickly demounted from the spindle 11 and a tire removed from the tire mount.

A tire to be treated is then mounted on the fixed rim half 20, the demountable rim half 50 replaced on the collar 52 so that the rim beads of the tire T are properly engaged by the rim flanges of the rim halves. Air under about 150 pounds pressure is then admitted to the air transfer chamber 28 whence the air passes immediately via a port 64 in the outer tubular shaft 11 and a port 65 in the inner tubular shaft 51 for transmission via the latter into the cylindrical housing 23 via a diagonal port 66 formed in the inner tubular shaft 51 to terminate adjacent the piston 57 mounted thereon. In this manner the piston 57 is promptly forced away from the flange 22 on the fixed tubular shaft 11 against the action of the compression spring 63. Suitable radial slits 67 formed in the cover 62 at the end of the housing 23 allow air behind the piston to bleed in and out of the open end of the housing 23. The quick movement of the piston 57 draws the inner tubular shaft 51 axially of the fixed spindle shaft 11 and with it the movable rim half 50 is pressed against the fixed rim half 20 they having a rubber seal 68 at their meeting edges to seal the same.

Simultaneous with admittance of air under pressure to the air transfer chamber 28 such air is admitted into the vestibule 69 of the ratio meter 36. At the time the air enters the vestibule 69, there being no air in the tire T, the small end 70 of a floating piston 71 mounted within the ratio meter is unseated from a valve seat 72. The incoming air is discharged directly from the vestibule 69 into the first annular chamber 43 and thence via the air inlet port 45 into the interior of the tire casing mounted on the split rims 13.

The small end 70 remains unseated until the air pressure in the tire T builds up to a pressure of about 5 pounds per square inch whereupon such pressure is immediately transmitted from the tire via the port 46 into the annular air passage 47 in the fixed rim half 20. This air pressure then enters the other annular chamber 44 via port 48 from the passage 47 and such air at 5 pounds per square inch is impressed upon the enlarged back face 73 of the floating piston 71. The area of the back face 73 is enough greater than that of the small end 70 of the floating piston 71 so as to overcome the pressure of the incoming air from the vestibule 69. The small end 70 of the floating piston 71 is thereby pressed against the valve seat 72 to bar further admittance of air onto the annular chamber 43 and tire until the air pressure in the tire drops whereupon the floating piston 71 may fluctuate between open and closed valve condition to maintain about 5 pounds pressure of air within the tire being treated.

All of the foregoing operation is much the same as that of the device described and claimed in the aforementioned Patent No. 3,127,916. The present invention has to do with a safety factor whereby to minimize and prevent injuries to persons operating such pneumatic tire mounts. The present invention resides in a safety release 75 for relieving the air pressure within the cylindrical chamber 23.

The safety release 75 includes the air escape valve 60 previously mentioned. One side of this valve 60 is the rubber seat 59 which is secured against the open end of the inner tubular shaft 51 by the threaded boss 58 of the piston 57. The rubber seat 59 has a central opening 76 concentric to an opening 77 in the boss 58 as well as the longitudinal axis of the inner tubular shaft 51. The central opening 76 in the rubber seat 59 is normally closed by the flat end of a valve head 78 which is larger in diameter than the opening 76.

The valve head 78 is secured to one end of a rod 79 the opposite end of which is slidably mounted in a threaded plug 80 secured axially of and in the inner tubular shaft 51. This plug 80 is formed as a part of a wheel retainer 81 the outer spread head 82 of which bears against the flanged end 55 of collar 52 upon which the movable rim half 50 is mounted.

The outer end of the head 82 has a reduced threaded nipple 83 extending outwardly therefrom. This nipple 83 and a portion of the head 82 has a central bore 84 which is of larger diameter than the rod 79, a threaded end 85 of which extends into the bore 84.

Referring to FIGS. 3 and 4 it will be noted that the nipple 83 and part of the head 82 is milled out at quadrantal slots 86 which extend radially from the central bore 84. A safety ring 87 having quadrantal spokes 88 which slidingly fit the slots 86 has a central hub 89 which fits the central bore 84 and is loosely mounted for tiltability relative to and on the threaded end 85 of the rod 79. A nut 90 is screwed onto the threaded end 85 of the rod 79 within the bore 84 to maintain the hub 89 of the safety ring 87 in position along the rod 79. The safety ring is centered by the mounting of the spokes thereof in the slots 86 of the head 82. Since the opening in the hub 89 is larger than the rod 79, the safety ring can wobble in any of the four directions of the slots 86.

The extreme end of the threaded portion 85 of the rod 79 is engaged by a compression spring 91, the opposite end of which is seated in a socket 92 formed in a handle shaft 93. This handle shaft 93 is sweat onto a handle retaining cap nut 94 having internal threading secured to the nipple 83. By this arrangement the rod 79 is constantly urged by the spring 91 in a direction to force the valve head 78 at the opposite end of the rod into engagement with the rubber seat 59 to close the air escape valve 60, and to force the safety ring 87 against the base 95 of the slots 86.

The safety release 75 is primarily effected by that end of the rod 79 which is adjacent the split rims 13. To this effect it will be noted that the rod 79 is shiftable axially within its mounting. By the same token the safety ring 87 is also shiftable as well as rockable within its quadrantal slot and central bore mounting in the head 82 of the plug 80. In other words, the base 95 of the slots 86 and central bore 84 is spaced from the adjacent end 96 of the handle retaining cap nut 94 so that the safety ring is free to move between the base 95 and end 96 of the nut.

The safety ring 87 has a peripheral annular flange 97 which extends over the flange 55 of the collar 52 and toward the outer face of the hub 54 of the movable rim half 50. The flange 97 is close enough to the rim 50 so that if the removable rim half 50 becomes misaligned, for example by someone's hand or finger coming between the half rims or should the tire T mounted on the rims 13 become faultily placed thereon, any motion of the half rim 50 outwardly causes it to engage the flange 97 of the safety ring 87. This moves or rocks the safety ring 87 off the base 95 of the slot and center bore and pushes outwardly the nut 90 on the ends 85 of the rod 79. Thus the rod 79 is drawn outwardly to unseat the valve head 78 at its opposite end relative to the valve seat 59. The valve 60 is thus opened to relieve the pressure within the cylinder 23 whereupon the compression spring 63 forces the piston 57 back toward the flanged end 22 of the cylinder. This shifts the inner tubular shaft 51 axially of the shaft 11 thus separating the split rims 13.

Disengagement of the movable rim 50 with the end of the flange 97 or upon release of the safety ring 87, the compression spring 91 immediately forces the rod 79 back toward the valve seat 59. Thus the valve head 78 on rod 79 is again forced against the valve seat 59 and the safety release valve 75 closed. The air pressure again builds up within the cylinder 23 to force the piston 57 away from the fixed flange end 22 of the cylinder. This shifts the inner tubular shaft 51 (to the left FIG. 1) to move the collar 52 and movable rim half 50 toward the fixed rim half 20. The tire T is thereby again properly mounted on the half rims 13 to receive air under pressure under the regulation of the ratio meter 36.

From the foregoing it will be appreciated that the safety release of the present invention prevents loss of fingers and minimizes injuries to anyone operating the pneumatic tire mount with which it is associated.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims.

1. In a split rim tire mount of the type including a pair of half rims one of which is axially movable toward the other on a rotary spindle having an axial passage communicating a source of air supplied under pressure with a tire mounted on such half rims and with pneumatic means operatively associated with such movable half rim for urging the latter toward the other one of said half rims; a touch sensitive release mechanism for relieving the air pressure within said passage comprising a rod mounted within said axial passage for movement axially of said spindle, a valve seat at one end of said spindle engageable by one end of said rod, means for releasably urging said rod toward said valve seat for closing the latter, and a manually touchable member mounted on the opposite end of said rod facilitating movement of said rod away from said valve seat.

2. In a split rim tire mount of the type including a pair of half rims one of which is axially movable toward the other on a rotary spindle having an axial passage communicating a source of air supplied under pressure with a tire mounted on such half rims and pneumatic means operatively associated with such movable half rim for urging the latter toward the other one of said half rims under the influence of the air pressure within said passage; a safety release comprising a rod mounted within said spindle for movement axially thereof, a safety relief valve at one end of said spindle engageable by one end of said rod, spring means for releasably urging said rod toward said safety relief valve, and a safety ring on the opposite end of said rod facilitating movement of said rod away from said safety valve for opening said safety relief valve to release the air pressure within said passage and tire.

3. In a split rim tire mount of the type including a pair of half rims one of which is fixed on a rotary spindle having an axial passage communicating a source of air supplied under pressure with a tire mounted on such half rims and a pneumatic means having a piston operatively associated with a tubular shaft mounted in the axial passage of said spindle for supporting the other one of said half rims for movement toward the fixed half rim under the influence of the air pressure within said passage; a touch sensitive safety release for relieving the air pressure within said axial passage comprising a rod mounted within said tubular shaft for movement therewith and axially thereof, a safety relief valve having a seat in said piston at one end of said tubular shaft, spring means between said tubular shaft and said rod for urging one end of said rod toward said valve seat for normally closing the same, and a safety ring mounted on the opposite end of said rod in spaced relation to said movable half rim for shifting said rod away from said valve seat whenever an object engages said safety ring for opening said safety relief valve to release the air pressure within said passage and tire.

4. In a split rim tire mount of the type including a pair of half rims one of which is fixed on a rotary spindle having an axial passage communicating a source of air supplied under pressure with a tire mounted on such half rims and the other of which half rims is mounted on a tubular shaft mounted for axial movement within said spindle, and a piston mounted on such tubular shaft operatively associated with pneumatic means communicating with said axial passage for urging such movable half rim toward the fixed one of said half rims under the influence of the air pressure within said passage; a safety release mechanism for quickly relieving the air pressure within said passage, tire and pneumatic means comprising a rod mounted within said tubular shaft for movement therewith and axially thereof, a valve seat in said piston at one end of the tubular shaft engageable by one end of said rod, spring means between said tubular shaft and said rod for urging the latter toward said valve seat for normally closing the same, and a safety ring at the opposite end of said rod in spaced relation to said movable half rim for engagement by any object and by said movable half rim whenever an object is interjected between said half rims for unseating said rod from said valve seat to release the air under pressure from within said axial passage, pneumatic means and the tire mounted on said half rims.

5. In a split rim tire mount of the type including one half rim fixed on a rotary spindle having an axial passage communicating a source of air supplied under pressure with a tire mounted on such split rim tire mount and having another half rim mounted on one end of a tubular shaft axially shiftable within such rotary spindle, the tubular shaft having a piston secured to its opposite end disposed in a cylinder mounted on said spindle in communication with the air passage therein for urging said piston in a direction to shift such movable half rim toward the fixed half rim under the influence of the air pressure within said passage; a safety release mechanism comprising a rod mounted within the tubular shaft for movement therewith and axially thereof, a valve seat in the piston at one end of the axial passage in such spindle, yieldable means between the tubular shaft and said rod for urging one end of said rod against said valve seat for normally closing the same, and a touch sensitive ring on the opposite end of said rod in spaced relation to such movable half rim and adapted upon being engaged to shift said rod away from said valve seat for opening said valve to release the air pressure from within the air passage, cylinder and tire.

6. In combination with a tire mount of the type including a pair of half rims one of which is fixed on a rotary spindle having an axial passage communicating a source of air under pressure with a tire mounted on such half rims, the other half rim being mounted on one end of a tubular shaft mounted in and axially movable relative to such spindle, such spindle having a cylinder mounted on its opposite end and said tubular shaft having a piston on its opposite end disposed within the cylinder for urging the tubular shaft in a direction to force the movable half rim thereon into tire supporting engagement with the rim half fixed on such spindle; a safety release mechanism comprising a valve seat formed in said piston, a rod coaxially of said tubular shaft having a valve head at one end disposed to engage said valve seat, a wheel retainer mounted on the opposite end of said tubular shaft having a head bearing against the hub of the movable half rim, said wheel retainer having a central bore confining the opposite end of said rod and quadrantal slots formed therein to a depth spaced outwardly from the hub mount of the movable half rim, a safety ring having quadrantal spokes arranged in said quadrantal slots and a central hub arranged in said central bore of said wheel retainer and on the said opposite end of said rod, a cap nut on the extreme end of said wheel retainer, a spring between said cap nut and said rod for urging the latter and the valve head end thereof toward said valve seat for closing the same, and a nut on said opposite end of rod engaging that face of said central hub opposite the hub mount of said movable wheel half whereby to withdraw said rod and the valve head end thereof off said valve seat when the safety ring is moved against the action of said spring outwardly of said quadrantal slots for any reason.

7. In a split rim tire mount of the type including one half rim fixed on a rotary spindle having an axial passage communicating a source of air supplied under pressure with a tire mounted on such split rim tire mount and having another half rim mounted on one end of a tubular shaft axially shiftable within such rotary spindle, the tubular shaft having a piston secured to its opposite end disposed in a cylinder mounted on said spindle in communication with the air passage therein for urging said piston in a direction to shift such movable half rim toward the fixed half rim under the influence of the air pressure within said passage; a safety release mechanism comprising a rod mounted within the tubular shaft for movement therewith and axially thereof, a valve seat in the piston engageable by one end of said rod, yieldable means between the tubular shaft and said rod for urging said one end of said rod against said valve seat for normally closing the same, a wheel retainer mounted on the opposite end of the tubular shaft having a central bore confining the opposite end of said rod, quadrantal slots formed in said wheel retainer to a depth spaced outwardly from movable half rim on the tubular shaft, a safety ring having quadrantal spokes arranged in said quadrantal slots and having a central hub arranged in the central bore of said wheel retainer and slidably arranged on the said opposite end of said rod, a cap nut on the extreme end of said wheel retainer limiting outward movement of said safety ring relative thereto, a spring between said cap nut and said rod for urging the latter and the valve head end thereof toward said valve seat for closing the same, and a head on said opposite end of rod within said central bore engaging that face of the central hub of said safety ring whereby to withdraw said rod and the valve head end thereof off said valve seat when the safety ring is for any reason moved outwardly of said quadrantal slots against the action of said spring.

No references cited.

WILLIAM W. DYER, JR., *Primary Examiner.*
R. J. ZLOTNIK, *Assistant Examiner.*